Jan. 3, 1967 J. A. BALDWIN, JR 3,296,455

BISTABLE MAGNETIC CORE CIRCUIT

Filed Aug. 15, 1962

INVENTOR
J. A. BALDWIN, JR.
BY
Charles Scott Phelan
ATTORNEY

United States Patent Office 3,296,455
Patented Jan. 3, 1967

3,296,455
BISTABLE MAGNETIC CORE CIRCUIT

John A. Baldwin, Jr., Albuquerque, N. Mex., assignor to Bell Telephone Laboratories, Incorporated, New York, N.Y., a corporation of New York Filed Aug. 15, 1962, Ser. No. 217,070
12 Claims. (Cl. 307—88)

This invention relates to a bistable magnetic circuit and more particularly it relates to such a circuit wherein input signals may be continuously coupled to a selected one of two output circuits without producing significant signal variations at the other one of the two output circuits.

Generally prior art bistable circuits may rest in either one of two stable conditions, and such circuits have two output connections and at least one input connection. Pulses applied at the input produce a signal change at one of the two output connections and can also produce simultaneously at least some further signal change at the other output connection. For example, in laddic-type bistable circuits loading of the output circuit coupled to one branch will cause some flux to be diverted to another output branch thereby producing a significant output signal from such further branch. Also, in the multivibrator type of bistable circuits, a positive-going signal at one output connection is accompanied by a negative-going signal at the other output connection and vice versa.

Such prior art circuits are not well suited to signal steering applications because it is not possible to obtain consistently a signal at one output circuit with no signal at the other. In order to produce such a result it would be necessary to utilize additional gated amplifier stages in each of the bistable circuit output connections. Furthermore, the prior art bistable circuits are not well suited for storing information bits in a binary signaling system because the interrogation of such a circuit normally destroys the information stored therein.

It is therefore one object of the invention to eliminate complementary signal variation effects at the output connections of a bistable network.

It is another object to operate a bistable magnetic circuit as a semipermanent memory element in which information bits may be stored and thereafter nondestructively interrogated.

It is a further object to produce at either of two output connections of a bistable circuit independent signal variations.

An additional object is to provide a bistable magnetic circuit which can be loaded significantly at one output without producing substantial signals at another output.

These and other objects of the invention are realized in an illustrative embodiment wherein three magnetic devices with substantially rectangular hysteresis characteristics are electromagnetically coupled together so that a flux change in a first one of such devices tends to produce an opposite flux change in the second and third devices. The devices and the coupling among them are further characterized in that under one set of conditions flux switching takes place faster in the second device than in the third, but under a second set of conditions the third device switches faster than the second. This result is obtained by arranging the coupling so that it has for each device the same magnetization potential, i.e., the same product of coupling circuit turns times maximum switchable flux.

Drive signals are applied to the first device and the aforementioned electromagnetic coupling causes only one of the other two devices to switch with the first device.

The particular additional device that switches is determined by the stable state in which the second device rests just prior to the application of the drive signal. Reset signals are applied to all three of the magnetic devices so that the first device is restored and the one of the other two devices that was switched by the drive signal is also restored. Accordingly, output circuits coupled to the second and third devices are activated only when their particular device is the particular additional device switched by a drive signal.

It is one feature of the invention that an integral cooperative network of magnetic circuit elements is arranged in a bistable magnetic circuit in which only a portion of the elements switch at any one time and no significant output signal is produced in an output circuit unless that circuit is coupled to a magnetic device in the network which is switched by the drive signal.

It is another feature of the invention that three magnetic devices are coupled together so that a first one of them receives drive signals and one of the second or third devices produces output signals. Switching speeds of the second and third devices are fixed by the manner in which they are coupled together so that the second device switches faster than the third in the absence of a reset signal and the third device switches faster than the second in the presence of a reset signal.

An additional feature of the invention is that three magnetic devices are coupled together so that by controlling the remanent magnetic state of one of the three devices an output signal may be caused to appear at a selected one of two output circuits with substantially no signal appearing on the other output circuit.

A further feature is that partial switching of devices is prevented by the combination of equal magnetization potentials for the devices related by the coupling means, with the different device switching speeds, which causes no more than two of the coupled magnetic devices to have a significent amount of flux switched an any one time.

A more complete understanding of the invention may be obtained from a consideration of the following detailed description, and the appended claims, in connection with the attached drawing in which:

Figure 1:
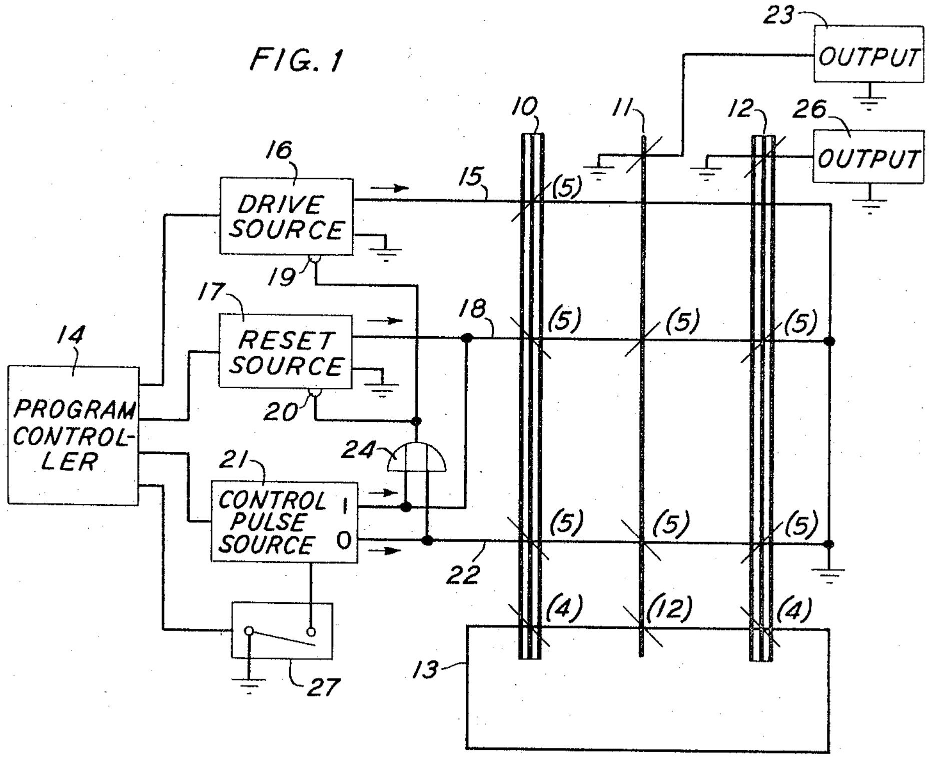
FIG. 1 is a schematic diagram of a bistable magnetic circuit in accordance with the invention.

In FIG. 1 three magnetic devices 10, 11, and 12 are provided. These devices have substantially rectangular hysteresis characteristics defining two stable remanent flux conditions between which the devices may be switched by the application of magnetic fields of appropriate polarity and intensity. Such devices may typically take the form of toroidal magnetic cores and are hereinafter described in connection with core terminology since the use and operation of such cores individually are well known in the art. Conventional mirror symbology is employed in FIG. 1 to represent cores 10, 11, and 12 and the various circuits associated therewith. Briefly, in terms of such symbology, heavy vertical lines are utilized to represent magnetic cores, and electric circuits electromagnetically coupled thereto are indicated by perpendicular circuit lines with short slanted lines at coupling intersections of circuits and cores. In the embodiment of FIG. 1 cores 10 and 12 have three times the magnetic path cross sectional area of core 11 and this is indicated by the use of a single heavy line to represent core 11 and three joined heavy lines to represent each of the cores 10 and 12. All three cores have the same magnetic path length.

In accordance with the usual convention, the direction of magnetic flux polarization generated in a core by current flowing in a circuit coupled thereto is indicated by determining the direction in which the current direction arrow of the circuit in question would be reflected from the short slanted line at the circuit-core intersection. In order to find the direction of current that would be induced in a further circuit as a result of any flux change resulting from the flux polarization just mentioned, the changed flux arrow is followed to the end of the core, reversed, and followed back along the core to the point of coupling intersection with the further circuit in question. The direction of the induced current is then the direction in which the flux change arrow, as reversed, would be reflected along the circuit line by the short diagonal at the core-circuit intersection with such further circuit.

The numbers of turns of some of the circuits on the various cores involved in the illustrated embodiment of the present invention are shown in FIG. 1 in parentheses adjacent circuit-core intersections. It is to be understood, however, that these numbers of turns in no way constitute a limitation upon the underlying invention. They indicate merely one proportionality employed in one specific embodiment with certain cores and wires.

A coupling loop circuit 13 links all three of the cores 10, 11, and 12 in the same sense so that the switching of any one of the three cores to one of its stable conditions induces a current in loop 13 which tends to drive the other two cores to their second stable condition. Whether or not the induced current in circuit 13 actually produces a switch in any one of the remaining two cores depends upon the previous condition of each of those cores and upon other factors such as the duration of signals applied to the bistable circuit and the influences of other fields that may be simultaneously applied to the same cores. In the embodiment of FIG. 1 loop circuit 13 has three times as many turns on core 11 as it has on either of the cores 10 and 12. Since the maximum switchable flux for any core is a function of the cross sectional area of the magnetic flux path, each of the cores 10 and 12 has three times the maximum switchable flux of core 11 so that the product of maximum switchable flux times the number of coupling loop turns for each of the three cores is the same, and this product is herein designated "magnetization potential."

A program controller 14 represents the program signal source of a computer in which the invention may be employed. A source 16 supplies drive signal pulses under the control of controller 14 to a circuit 15 which is coupled to core 10 in opposite sense with respect to the coupling of loop circuit 13 on core 10. Each pulse from source 16 is of at least sufficient magnitude and duration to switch core 10 from one of its stable conditions to the other when the circuit is in the initial condition shown on the first line of FIG. 2B. This drive pulse magnitude is twice that which would be required to switch core 10 were it not coupled with cores 11 and 12 through the coupling loop circuit 13. This derives from the fact that, when the drive pulse takes the circuit from the state shown on the first line of FIG. 2B to that shown on the second line, the condition after a drive pulse, the circuit behaves like a single core having a magnetic path length twice that of core 10 alone. If in FIG. 1 core 10 is initially magnetized downward, a pulse from source 16 switches the core to magnetization in the upward direction in the plane of the drawing. Since drive circuit 15 engages only core 10, it is not necessary to impose a maximum limitation upon the amplitude or duration of pulses from source 16. The duration of drive pulses must be sufficient to allow core 10 to be switched. This has been found to be the interval required to switch approximately 90 percent of the flux in core 10 at whatever drive pulse amplitude is applied.

A reset signal source 17 supplies to a reset circuit 18 pulses which are similar in polarity, magnitude, and duration to those applied from source 16 to the drive circuit 15. Source 17 also operates under the control of program controller 14. Reset circuit 18 is electromagnetically coupled to core 10 in the same sense as coupling loop circuit 13 and to cores 11 and 12 in opposite sense with respect to the coupling loop circuit 13. The reset circuit has the same number of turns on all of the cores as the drive circuit has on core 10.

Sources 16 and 17 have inhibiting input connections 19 and 20, respectively, which are utilized for controlling the operating mode of the bistable circuit. A control pulse source 21, operated by controller 14, has its ONE and ZERO outputs connected through an OR logic gate 24 to the inhibiting input connections 19 and 20. The same ONE output is also connected to reset circuit 18. Either source 17 or source 21 may apply pulses to reset circuit 18, but both sources cannot apply such signals simultaneously because the ONE output of source 21 also inhibits sources 16 and 17. Each of the sources 16, 17, and 21 is arranged in a manner known in the art so that essentially an open circuit is presented at any output connection in the absence of a pulse from the source at such connection.

Source 21 may be any suitable source of write-in signals for controlling the mode of operation of the circuit of FIG. 1 in a manner which will be subsequently described. The output characteristics of source 21 are such that when it is desired to place the circuit of FIG. 1 in a first of its modes of operation, source 21 applies a pulse to inhibiting inputs 19 and 20 for blocking the outputs of sources 16 and 17 and for coupling to circuit 18 a pulse of approximately the same magnitude and polarity as pulses from source 16 but of much longer duration. However, if it is desired to place the circuit of FIG. 1 in its second mode of operation, a similarly extended pulse is applied from the ZERO output of source 21 through OR gate 24 to inhibit sources 16 and 17; and it is applied directly to a write-in, or switching, circuit 22. A switch 27 is provided in the ground return lead of source 21 to disable that source when it is not in use. Switch 27 is also operated by controller 14.

Inhibiting inputs 19 and 20 may be any circuits suitable to the purpose. For example, they may connect to internal logic circuits for opening the ground return for the inhibited source.

Circuit 22 is coupled to cores 10 and 11 in the same sense as the coupling loop circuit 13 and is coupled to core 12 in opposite sense. However, circuit 22 has the same number of turns engaging each core, and this number is in turn equal to the number of turns of circuit 18 on each core. It will be observed from FIG. 1 and from the preceding description that the engagement of circuits 18 and 22 with cores 10, 11, and 12 is different only in respect to the fact that the two circuits engage core 11 in opposite sense. The reason for this is that it has been found that by controlling the state of core 11 with respect to the stability state of cores 10 and 12 the mode of operation of the circuit of FIG. 1 can be controlled.

Considering the operation of the circuit in FIG. 1, it is assumed that switch 27 is closed, and a write-in pulse is applied from the ONE output of source 21 through gate 24 to inhibiting inputs 19 and 20. The same pulse is coupled to circuit 18 for switching core 10 to the downward, or ZERO, magnetization condition and switching cores 11 and 12 to the upward, or ONE, magnetization condition. Details of the write-in operation will be discussed subsequently. After the write-in operation is completed, controller 14 opens switch 27, and pulses are applied to circuits 15 and 18 alternately from sources 16 and 17.

The first drive pulse in circuit 15 switches core 10 to the ONE condition and generates a clockwise induced current in coupling loop circuit 13. This clockwise current tends to switch both cores 11 and 12 from the ONE to the ZERO condition. Since core 11 has three times as many coupling loop turns as does core 12, it is subjected to a much greater magnetomotive force and it switches much faster than core 12. Consequently, core 11 absorbs substantially all of the voltage induced in loop 13 by the switching of core 10. Since core 10 was driven quite hard by a drive signal of about twice the magnitude required to perform a switching operation, it switches quite rapidly; and the complete switching of cores 10 and 11 is accomplished before sufficient flux can be changed in core 12 to cause it to switch. The conditions of the cores in FIG. 1 after the application of each drive pulse is indicated in the corresponding line of FIG. 2A. Cores 10 and 12 are now in the ONE condition and core 11 is in the ZERO condition.

Figure 2A:
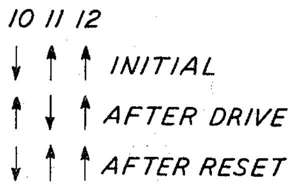
FIGS. 2A and 2B include diagrams illustrating the conditions of the magnetic devices in the circuit of FIG. 1 at various stages in the operation thereof.

A reset pulse from source 17 is applied to reset circuit 18 and drives core 10 back to the ZERO condition and tends to drive cores 11 and 12 to the ONE condition. Since core 12 is already in the ONE condition, the reset signal simply restores cores 10 and 11 to their initial conditions with core 10 in the ZERO condition and core 11 in the ONE condition as indicated in FIG. 2A. The switching of core 10 to ZERO in response to the reset signal induces a counter-clockwise current in coupling loop 13 which tends to drive cores 11 and 12 to the ONE condition thereby aiding the effects produced by the reset circuit. Subsequent alternate applications of drive and reset pulses to circuits 15 and 18 continue to switch cores 10 and 11 in the manner just described without accomplishing a complete switching operation in core 12.

An output circuit 23 which is coupled to core 11 is energized by the switching of core 11 during each cycle of the operation just described. A second output circuit 26 is coupled to core 12 and may receive small induced voltages during the operation just described as a result of small partial flux reversals in the core. However, it has been found that so little flux in core 12 switches that resulting signals in output circuit 26 are insignificant even though circuit 23 constitutes a sufficient load to develop a significant back magnetomotive force in core 11.

The second mode of operation for the circuit in FIG. 1 is realized by switching the initial condition of core 11, i.e., the condition prior to the application of a drive pulse, from the upward to the downward condition of magnetization. This is accomplished by the application of a pulse from the ZERO output of control source 21 to inhibiting inputs 19 and 20 and to the switching circuit 22. The ZERO pulse drives cores 10 and 11 to the ZERO condition and core 12 to the ONE condition if they had not previously been in that condition. If the circuit of FIG. 1 had previously been operating in its first mode as just described, the control pulse on circuit 22 would be able to switch only one of the cores 10 or 11 depending upon whether the drive pulse or the reset pulse preceded the control pulse. Since only one core may be switching, a pulse of relatively long duration is employed so that the current induced in coupling loop circuit 13 as a result of the switching of one of these cores may have ample opportunity to be dissipated in the impedance of the short-circuited coupling loop 13.

Although either core 11 or core 10 may be switched by the ZERO control pulse from source 21, it is convenient to define the purpose of the control pulse as being to establish the stable condition of core 11 with respect to the stable conditions of cores 10 and 12. Thus, in the initial condition before the application of a drive pulse for the first mode of operation, core 11 was in the same, ONE, stable state as core 12 and in the opposite state from core 10. Now at the outset of the second mode of operation, core 11 is in the same, ZERO, state as core 10 and in the opposite state from core 12.

Figure 2B:
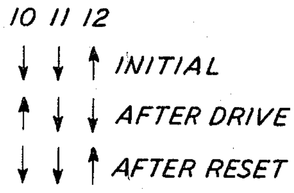

In mode 2 a drive pulse in circuit 15 switches core 10 to the ONE condition and induces a clockwise current in coupling loop circuit 13. This clockwise current tends to drive cores 11 and 12 to the ZERO condition as before, but core 11 is already in the ZERO condition. Consequently, core 12 switches together with core 10 so that it absorbs substantially all of the voltage induced in coupling loop 13 by the switching of core 10. Now core 10 is in the ONE condition and cores 11 and 12 are magnetized in the ZERO condition as indicated in FIG. 2B.

A reset pulse in circuit 18 drives core 10 back to the ZERO condition and tends to drive cores 11 and 12 to the ONE condition. This induces a net clockwise current in coupling loop 13 which tends to drive cores 11 and 12 to the ZERO condition. Thus, each of the cores 11 and 12 is subjected to two opposing switching influences, one due to the reset signal in circuit 18 and one due to the induced signal in coupling loop circuit 13. Under these conditions it has been found that the rate of flux change in core 12 is greater than the rate of flux change in core 11. The net current induced in coupling loop 13 as a result of flux switching initiated in all three cores by the reset current tends to aid the effect of the current in circuit 18 on core 10 and to oppose it on cores 11 and 12. The opposing magnetomotive force produced by the current in coupling loop 13 on cores 11 and 12 is numerically smaller than the resetting magnetomotive force produced in these cores by the current in circuit 18. Because coupling loop 13 makes a greater number of turns on core 11 than it does on core 12, this inhibiting effect is three times as strong in core 11 as it is in core 12. Consequently, core 12 switches together with core 10 and no permanent switching is accomplished in core 11. Thus, after the reset signal has terminated cores 10 and 11 are in the ZERO condition and core 12 is in the ONE condition as indicated in FIG. 2B.

The process of resetting in the second mode of operation may be seen in a different way by means of a mathematical model. Let the product of the rate of change of flux in a core during switching times the number of turns made by the coupling loop 13 on that core be designated by the symbol $x$. The voltage induced in the coupling loop 13 by the core is proportional to $x$. It is well known that in any closed loop circuit the sum of the voltages induced in the circuit is equal to the current flowing in the circuit times the resistance of the circuit. Thus, the sum of the voltages induced in coupling loop 13 by cores 10, 11 and 12 must be equal to the current flowing in coupling loop 13 times the resistance of that winding. Now coupling loop 13 is designed to have a very small resistance. Since the current in coupling loop 13 cannot become infinate, we conclude that the sum of the voltages induced in coupling loop 13 by cores 10, 11, and 12 must be approximately equal to zero. This may be mathematically stated in the form $$x_{10}+x_{11}+x_{12}=0 \qquad (1)$$

If it is now assumed that the rate of change of flux density $dM/dt$ for a core is equal to a magnetization constant R for the magnetic material times the ampere-turns of each circuit influencing the core, the rate of flux density change for each core may be written as follows:

$$\frac{dM_{10}}{dt}=R(5i_{18}-4i_{13}) \qquad (2)$$

$$\frac{dM_{11}}{dt}=R(-5i_{18}-12i_{13}) \qquad (3)$$

$$\frac{dM_{12}}{dt}=R(-5i_{18}-4i_{13}) \qquad (4)$$

where rate of change of flux density is considered positive if directed downward in FIG. 1 and current in coupling loop 13 is considered positive if directed counter-clockwise.

The Arabic numeral coefficients in the above equations for the reset circuit current $i_{18}$ and the coupling loop circuit $i_{13}$ correspond to the numbers of turns of each of those circuits on the respective cores. Signs indicate generated flux polarities. Now since $$x=ANM$$

where A is the cross sectional area of a core and N is the number of turns made on it by the coupling loop 13, we may write, using Equation 1

$$A_{10}N_{10}\frac{dM_{10}}{dt}+A_{11}N_{11}\frac{dM_{11}}{dt}+A_{12}N_{12}\frac{dM_{12}}{dt}=0 \qquad (5)$$

Now the circuit is designed such that $$A_{10}N_{10}=A_{11}N_{11}=A_{12}N_{12} \qquad (6)$$

Thus $$\frac{dM_{10}}{dt}+\frac{dM_{11}}{dt}+\frac{dM_{12}}{dt}=0 \qquad (7)$$

Substituting expressions (2), (3) and (4) above into this expression we obtain the coupling loop current in terms of reset circuit current.

$$i_{13}=-\tfrac{1}{4}i_{18} \qquad (8)$$

It will be noted that $i_{13}$ is negative, i.e., it flows in a clockwise direction.

When this relation is substituted in the Equations 2, 3, and 4 for rate of flux density change in the three cores, the following three relationships result:

$$\frac{dM_{10}}{dt}=6Ri_{18} \qquad (9)$$

$$\frac{dM_{11}}{dt}=-2Ri_{18} \qquad (10)$$

$$\frac{dM_{12}}{dt}=-4Ri_{18} \qquad (11)$$

From the Equations 10 and 11 it is apparent that core 12 receives from the reset and coupling circuits twice the drive of core 11 and as a result switches approximately twice as fast as core 11. Thus, during reset in the second mode of operation, core 12 switches to absorb the bulk of the induced voltage in coupling loop 13 as a result of the switching of core 10; and no substantial permanent switching takes place in core 11.

The second mode of operation produces in output circuit 26 pulses corresponding to the input signals applied to core 10 and no substantial output signals are produced in output circuit 23.

In summary, then, by controlling the initial state of core 11 the switching of core 10 may be caused to produce switching of either one of the cores 11 or 12. Consequently, input signals are coupled either to output circuit 23 or to output circuit 26 depending upon the initial condition of core 11 prior to the application of a drive signal on circuit 15. Output circuits 23 and 26 may comprise substantial loads without altering the described operation of the circuit of FIG. 1. The bistable magnetic core circuit of FIG. 1 is thus operating as a signal steering circuit. Operation as a bistable memory element may be accomplished by considering, for example, only the output circuit 23. Now, by operation of control pulse source 21 core 11 may be initially placed in the ONE condition to store a ONE in the circuit. Subsequent operation of sources 16 and 17 produces corresponding output signals in circuit 23. However, if source 21 is operated to place core 11 in the ZERO condition, subsequent operation of sources 16 and 17 produces no significant output in circuit 23 thereby indicating that a ZERO has been stored. After any one particular condition has been written into the circuit of FIG. 1, sources 16 and 17 may thereafter be alternately operated to perform repeated interrogations of the bistable circuit for reading out information that is stored therein without destroying such information.

Figure 1A:
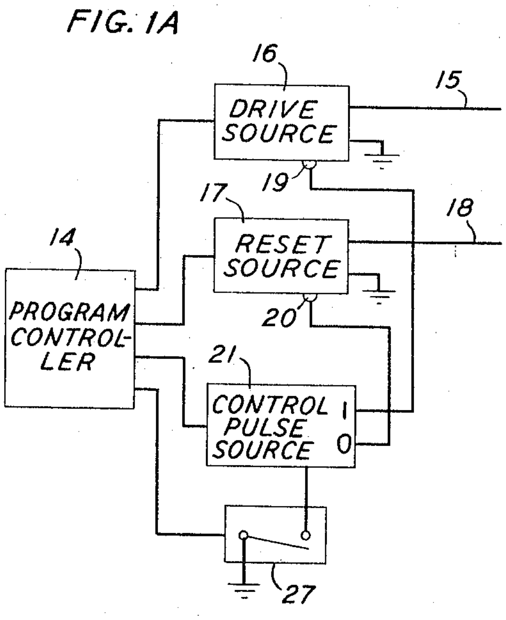
FIG. 1A is a partial schematic diagram illustrating one possible variation of the circuit of FIG. 1.

FIG. 1A shows a partial schematic diagram of a variation of FIG. 1 illustrating a somewhat different arrangement for writing information into the bistable circuit for controlling the mode of operation. Switching circuit 22 and gate 24 are eliminated. In this case control pulse source 21 has its output circuits arranged so that it may inhibit either one of the two sources 16 or 17 when switch 27 is closed, or neither of them when switch 27 is open. If source 21 is inoperative, i.e., switch 27 is open, drive and reset sources 16 and 17 apply alternate signals to the bistable circuit in the manner previously described for producing output signals in accordance with the particular mode of operation that may have been directed. If source 21 is energized to produce a ONE output, only source 16 is inhibited. Reset pulses are repeatedly applied to circuit 18 with no intervening drive pulses, and the reset pulses tend to drive core 10 to the ZERO condition and cores 11 and 12 to the ONE condition.

Assuming the most difficult write-in situation, consider that cores 10 and 11 had previously been in the ZERO condition and core 12 in the ONE condition. Now the repeated application of reset pulses to core 11 accomplishes the switching of that core alone in successive flux increments to produce essentially the same effect as has been previously described in connection with the application of an extended pulse from control source 21 directly to reset circuit 18. The bistable circuit is in this manner conditioned for operation in its first mode as illustrated in FIG. 2A.

If it is desired to change to the second mode of operation of the circuit of FIG. 1 using the arrangement of FIG. 1A, source 21 is switched to produce a ZERO output for inhibiting source 17 and thereby permitting successive drive pulses to be applied to circuit 15 with no intervening reset pulses. The first one of these drive pulses switches core 10 to the ONE condition and core 11 to the ZERO condition if they had previously been otherwise situated. Subsequent drive pulses repeatedly attempt to switch core 10 to the same condition. Since magnetic materials are not ideal and do not have perfectly rectangular hysteresis characteristics, each of the subsequent drive pulses tends to drive core 10 further into saturation in the ONE direction and the core relaxes to its stable ONE remanent flux condition upon the removal of the drive pulses. Consequently, each drive pulse causes in core 10 a small drive to saturation followed by relaxation to the remanent ONE condition. Corresponding voltages are induced in coupling loop circuit 13 and have been found ultimately to switch core 12 to the ZERO condition. The final state is shown on the second line of FIG. 2B as the condition after a drive pulse. Apparently the voltages average to produce a net clockwise current in the coupling loop 13 to drive drive cores 11 and 12 to the ZERO condition. This operation sets the circuit in the "After Drive" phase of the second mode of operation as shown in FIG. 2B. The application of an extended control pulse from source 21 of FIG. 1 to the switching circuit 22 also sets the circuit to the second mode of operation but in the "Initial" phase shown in FIG. 2B.

Although this invention has been described in connection with particular embodiments thereof, additional embodiments and applications will be obvious to those skilled in the art and are included within the spirit and scope of the invention.

What is claimed is:

1. A bistable magnetic core circuit comprising
first, second, and third cores of magnetic material having substantially rectangular hysteresis characteristics defining two stable conditions of magnetic flux remanence, a first and a third one of said cores having a greater cross sectional area than a second one of said cores,
a coupling loop circuit linking all of said cores in the same sense so that the product of coupling loop turns times the maximum switchable flux is the same for all cores, a drive signal circuit linking said first core in the opposite sense with respect to said coupling loop circuit for applying signals to switch said first core to a first one of its two stable conditions, and a reset circuit linking all three of said cores for applying signals to reset said first core to the second of its two stable conditions, said reset circuit linking said core in the same direction as said coupling loop circuit and linking said second and third cores in opposite sense with respect to the windings of said coupling loop circuit thereon.

2. A bistable magnetic core circuit comprising three magnetic cores each having substantially rectangular hysteresis characteristics defining two stable conditions of remanent flux between which said device may be switched by the application of a magnetic field of appropriate intensity and polarity, a coupling loop circuit linking all of said cores in the same sense, the cross sectional areas of said cores and the numbers of coupling loop turns on each of said cores being proportioned so that the product of coupling loop turns and maximum switchable flux for each core is the same for all cores, a drive circuit coupling signals to said first core, said circuit linking said first core in opposite sense with respect to the turns of said coupling loop circuit thereon, a reset circuit linking said first core in the same sense as said first coupling link circuit and linking said second and third cores in the opposite sense with respect to the turns on said coupling loop circuit on each of them, and means controlling the initial condition of said second core before application of a drive signal so that only said first and second cores switch together in response to drive and reset signals when said second core is initially in a first one of its stable conditions and only said first and third cores switch together when said second core is initially in the second one of its stable conditions.

3. The bistable magnetic core circuit in accordance with claim 2 which comprises means selectively inhibiting either said drive circuit or said reset circuit to permit the repetitive application of signals from the other for a predetermined interval.

4. The bistable magnetic core circuit in accordance with claim 2 in which a switching circuit links said first and second cores in the same sense as said coupling loop circuit and said third core in opposite sense, and means apply a pulse selectively to either said reset circuit or said switching circuit of sufficient duration to persist until the substantial dissipation of induced current in said coupling loop circuit.

5. A magnetic core circuit comprising three magnetic cores each having two stable conditions of magnetic flux remanence of opposite polarity, an input circuit linking a first one of said cores, two separate output circuits linking the second and third ones of said cores respectively, means resetting cores that are switched by signals applied to said input circuit, and means selectively coupling signals in said input circuit through said cores to either one of said output circuits, said coupling means comprising means setting said second core to one of its two stable conditions, such one stable condition determining which of said output circuits receives such signals.

6. A magnetic core circuit comprising first, second, and third cores of magnetic material having substantially rectangular hysteresis characteristics defining two stable conditions of remanent flux, said second core having a different cross sectional area from the others, a loop circuit coupled to all of said cores in the same sense so that the product of core cross sectional area times number of coupling loop turns thereon is the same for all cores, means controlling the stability condition of said second core with respect to the other two cores for storing one of two different bits of binary information in said magnetic core circuit, and means nondestructively reading information out of said magnetic core circuit, said read-out means comprising means driving said first core to a first one of its stable conditions, an output circuit coupled to at least one of said second and third ones of said cores, and means driving said first core to its second stable condition and at the same time applying fields to said second and third cores tending to switch such cores to their first stable condition.

7. A magnetic circuit comprising three magnetic devices having substantially rectangular hysteresis characteristics defining two stable conditions of remanent flux, means electromagnetically coupling said devices together so that a flux change in any one of them tends to produce a change in the opposite direction in the other two, means driving a first one of said devices to its first stable condition, means resetting said first device to its second stable condition and also coupled to second and third ones of said devices so that resetting signals tend to drive said second and third devices to their first stable conditions, said resetitng means arranged with respect to said second and third devices so that the rate of change of magnetic flux in said second device due to the combined influences of said resetting and coupling means is greater than the influences of such means on said third device, means controlling the stable condition of said third device, and output circuit means coupled to at least one of said second and third devices.

8. A magnetic core circuit comprising first, second, and third cores with substantially the same core diameter, said second one of said cores having a cross sectional area which is approximately one-third of the cross sectional area of the other two cores, the magnetic material of said cores having a substantially rectangular hysteresis characteristic defining two stable conditions of remanent magnetic flux, a closed loop circuit linking all of said cores in the same sense but having three times as many turns on said second core as on the other cores so that the product of loop turns times cross sectional area is the same for all cores, means applying a drive signal to said first one of said cores with at least twice the minimum signal magnitude required to switch such core between its two stable conditions, said drive signal having sufficient duration to switch said first core from its first stable condition to its second stable condition, a reset circuit linking all three of said cores so that a reset signal tends to restore said first core to its first stable condition and also tends to set said second and third cores to their second stable condition, said drive signal applying means and said reset circuit all having the same number of turns on all of said cores to which they are linked and having on their respective linkages on said first and third cores five-fourths as many turns as said loop circuit, first and second output circuits coupled to said second and third cores respectively, means connected to said reset circuit for applying thereto a pulse of sufficient duration to permit the substantial dissipation of induced current in said loop circuit, the magnitude of said pulse being substantially the same as drive signal magnitude, and means coupling to said cores a further extended pulse in the same sense as said reset circuit in the first and third cores but in opposite sense with respect to the reset circuit in said second core.

9. A bistable magnetic core circuit comprising three magnetic cores each having first and second states of stable magnetic remanence, a first input circuit coupled to a first one of said cores, a second input circuit coupled to all three of said cores, first and second output circuits coupled to second and third ones of said cores, respectively, means applying input signals to said first input circuit for switching said first core to said first state, means applying reset signals to said second input circuit for resetting said first core to said second state, a closed loop circuit linking all three of said cores for coupling a signal applied to said first core to a selectable one of said output circuits as a function of the state of said second core at the time of a signal in said first input circuit, and means selectably switching the stable state of said second core with respect to said first and third cores.

10. The magnetic core circuit in accordance with claim 9 which comprises in addition means loading at least one of said output circuits and thereby developing a substantial back magnetomotive force in the core to which such output circuit is coupled.

11. A bistable magnetic circuit comprising three magnetic devices having substantially rectangular hysteresis characteristics defining first and second stable conditions of magnetic flux remanence, a coupling loop circuit linking all of said devices in the same sense, a drive signal circuit linking a first one of said devices in opposite sense with respect to said coupling loop circuit for applying signals to switch said first device to a first one of its two stable conditions, and a reset circuit linking all three of said devices for applying signals to reset said first device to the second of its two stable conditions, said reset circuit linking said first device in the same direction as said coupling loop circuit and linking said second and third devices in opposite sense with respect to the windings of said coupling loop circuit.

12. A bistable magnetic circuit comprising a first, a second, and at least a third magnetic device each having substantially rectangular hysteresis characteristics defining two stable conditions of magnetic flux remanence between which said devices may be switched by the application of appropriate magnetic fields, a coupling loop circuit linking said devices so that said first device switches faster than said second device in response to a current in said coupling loop circuit and in the absence of other signals coupled to said first and second devices, means applying reset signals to said first, second, and third devices so that said second device switches faster than said first device, said reset signals switching said third device to one of its stable conditions, and means applying drive signals to said third device but not to said first and second devices for switching said third device to its second stable condition.

References Cited by the Examiner

UNITED STATES PATENTS

| | | | |
|---|---|---|---|
| 2,930,903 | 3/1960 | Andrews | 307—88 |
| 3,110,895 | 11/1963 | Brewster | 307—88 |

JAMES W MOFFITT, *Acting Primary Examiner.*

M. S. GITTES, *Assistant Examiner.*